United States Patent
Tseng et al.

(10) Patent No.: US 11,539,643 B2
(45) Date of Patent: *Dec. 27, 2022

(54) SYSTEMS AND METHODS OF INSTANT-MESSAGING BOT FOR ROBOTIC PROCESS AUTOMATION AND ROBOTIC TEXTUAL-CONTENT EXTRACTION FROM IMAGES

(71) Applicant: D8AI Inc., Taipei (TW)

(72) Inventors: Ping-Yuan Tseng, Taoyuan (TW); Chiou-Shann Fuh, New Taipei (TW); Richard Li-Cheng Sheng, Davis, CA (US); Hui Hsiung, Pasadena, CA (US)

(73) Assignee: D8AI Inc., Taipei (TW)

( * ) Notice: Subject to any disclaimer, the term of this patent is extended or adjusted under 35 U.S.C. 154(b) by 230 days.

This patent is subject to a terminal disclaimer.

(21) Appl. No.: 17/067,787

(22) Filed: Oct. 12, 2020

(65) Prior Publication Data
US 2021/0144110 A1    May 13, 2021

Related U.S. Application Data

(63) Continuation-in-part of application No. 16/677,645, filed on Nov. 7, 2019, now Pat. No. 11,146,509.

(51) Int. Cl.
*H04L 51/04* (2022.01)
*H04L 51/02* (2022.01)
(Continued)

(52) U.S. Cl.
CPC ............... *H04L 51/04* (2013.01); *G06N 3/02* (2013.01); *G06V 20/20* (2022.01); *H04L 51/02* (2013.01); *G06V 30/10* (2022.01)

(58) Field of Classification Search
None
See application file for complete search history.

(56) References Cited

U.S. PATENT DOCUMENTS

| | | | |
|---|---|---|---|
| 8,156,007 B1* | 4/2012 | Anthony | G06Q 99/00 705/26.1 |
| 8,213,737 B2* | 7/2012 | Steinberg | G06V 40/165 382/254 |

(Continued)

*Primary Examiner* — Quynh H Nguyen
(74) *Attorney, Agent, or Firm* — Winston Hsu

(57) ABSTRACT

Systems and methods of instant-messaging bot for robotic process automation (RPA) and robotic textual-content extraction from digital images include a chatbot application, a software RPA manager, and an instant-messaging (IM) platform, all built for an enterprise. The enterprise IM platform is connected to one or more public IM platforms over the Internet. The RPA manager contains multiple modules of enterprise workflows and receives instructions from the enterprise chatbot for executing individual workflows. The system allows enterprise users connected to the enterprise IM platform, and external users connected to the public IM platforms, to use instant messaging to initiate enterprise workflows that are automated with the help of the enterprise chatbot and delivered via instant messaging. Furthermore, textual-content extraction from digital images is incorporated in the RPA manager as an enterprise workflow, and provides improved convolutional neural network (CNN) methods for textual-content extraction.

8 Claims, 15 Drawing Sheets

(51) Int. Cl.
G06N 3/02 (2006.01)
G06V 20/20 (2022.01)
G06V 30/10 (2022.01)

(56) References Cited

U.S. PATENT DOCUMENTS

| | | |
|---|---|---|
| 2003/0182391 A1 | 9/2003 | Leber |
| 2016/0335142 A1* | 11/2016 | Zhou .................. G06F 9/48 |
| 2016/0342571 A1 | 11/2016 | Lane |
| 2017/0154347 A1 | 6/2017 | Bateman |
| 2017/0250930 A1 | 8/2017 | Ben-Itzhak |
| 2019/0103111 A1 | 4/2019 | Tiwari |
| 2019/0124020 A1 | 4/2019 | Bobbarjung |
| 2019/0243899 A1 | 8/2019 | Yi |
| 2019/0250891 A1* | 8/2019 | Kumar ............... G06K 9/6218 |
| 2021/0006656 A1* | 1/2021 | Gramacho .......... H04M 3/5191 |
| 2021/0029246 A1 | 1/2021 | Erhart |

* cited by examiner

SYSTEMS AND METHODS OF INSTANT-MESSAGING BOT FOR ROBOTIC PROCESS AUTOMATION AND ROBOTIC TEXTUAL-CONTENT EXTRACTION FROM IMAGES

CROSS REFERENCE TO RELATED APPLICATIONS

The present application is a continuation-in-part of U.S. patent application Ser. No. 16/677,645 filed on Nov. 7, 2019; the entire content of which is incorporated herein by reference.

BACKGROUND OF THE INVENTION

1. Field of the Invention

The subject matter disclosed herein relates generally to robotic process automation (RPA), text extraction, text detection, text recognition, computer vision, convolutional neural network (CNN), chatbots, natural language processing, conversational user interface, instant messaging (messaging apps), and human-chatbot communication. The present disclosure describes systems and methods of instant-messaging bot for robotic process automation and for robotic textual-content extraction from images specifically.

2. Description of the Prior Art

The present invention is aimed at solving three issues concerning robotic process automation (RPA): (1) RPA incorporating artificial intelligence and conversational user interface, (2) robotic workflows delivered via instant messaging and mobile Internet, and (3) robotic textual-content extraction from digital images. These issues are described one by one in the following.

Robotic process automation refers to business-process automation accomplished with software solutions. Similar to physical robots that boost efficiency for manufacturing and logistical processes, software robotics boosts efficiency for business processes, and hence RPA can play an essential role for enterprises implementing digital transformation. For an enterprise, business workflows automated with RPA may include its internal processes as well as customer-facing processes. Conventional RPA is carried out by computer software using rule-based algorithms. However, in order to be more intelligent and user-friendly, modern RPA needs to incorporate machine learning and deep learning algorithms, even using a chatbot as its conversational user interface.

Business processes are increasingly being conducted via the Internet, particularly mobile Internet. Costly custom-made mobile apps are developed for individual enterprises and for specific business processes, but users external to the enterprises are reluctant to download them. Therefore, customer-facing RPA delivered via mobile Internet without the need for external customers to download an extra app is desirable. Furthermore, instant messaging has replaced telephone conversations and e-mail communication as the most prevailing means of communication in our daily life. A few popular public messaging apps, such as WhatsApp, Facebook Messenger and WeChat, with each supporting over a billion active users, are readily available. Taking advantage of the availability of public messaging apps and using them as the primary user interface for enterprises' external customers, the present invention is able to provide robotic workflows over mobile Internet via an instant-messaging bot, without the need for the external customers to download an extra mobile app.

In recent years, the needs for instant extraction of textual information from digital images delivered online have grown substantially. For example, using a mobile app, one can deposit a check into a bank account online simply by taking a photograph of the check with an in-app camera, submitting the check image for instant textual-content extraction, and confirming the result—the entire process is carried out with a few finger touches on a smartphone screen. Similarly, one can make an insurance claim using a mobile app by submitting photos of receipts or other proof-of-loss documents. To automate the above processes, instant extraction of textual content from digital images is an essential step.

For decades, textual-content extraction has been carried out by conventional optical character recognition (OCR) techniques. While conventional OCR is good for images of well-defined document formats on a clean background, it is not effective for images of unknown formats or on a complex background. In recent years, convolutional neural network (CNN) has been applied to textual-content extraction, making the process more generic and robust. However, further development and implementation of improved CNN methods tailored for practical textual-content extraction are still needed.

The objectives of the present invention are to solve aforementioned issues by providing systems and methods of instant-messaging bot for robotic process automation, including new CNN methods for textual-content extraction from digital images.

SUMMARY OF THE INVENTION

The present invention discloses systems and methods of instant-messaging bot for robotic process automation (RPA) and robotic textual-content extraction from digital images. Such a system includes a chatbot application, a software RPA manager, and an instant-messaging (IM) platform, all built for an enterprise (or organization). The RPA manager contains multiple modules of enterprise workflows and receives instructions from the enterprise chatbot for executing individual workflows. The enterprise IM platform is further connected to one or more public IM platforms over the Internet.

The system allows enterprise users connected to the enterprise IM platform, and external users connected to the public IM platforms, to use instant messaging to communicate with the enterprise chatbot and with one another either one-to-one or as a group. It further enables the enterprise users and the external users to initiate enterprise workflows, either internal or customer-facing, that are automated with the help of the enterprise chatbot and delivered via instant messaging.

Furthermore, the present invention incorporates textual-content extraction from digital images in the RPA manager as an enterprise workflow, and it provides improved convolutional neural network (CNN) methods for textual-content extraction.

These and other objectives of the present invention will no doubt become obvious to those of ordinary skill in the art after reading the following detailed description of the preferred embodiment that is illustrated in the various figures and drawings.

DETAILED DESCRIPTION

The scope of the present invention is defined by the claims appended to the following detailed description, while the embodiments described herein serve as illustrations, not limitations, of the claims.

Figure 1:
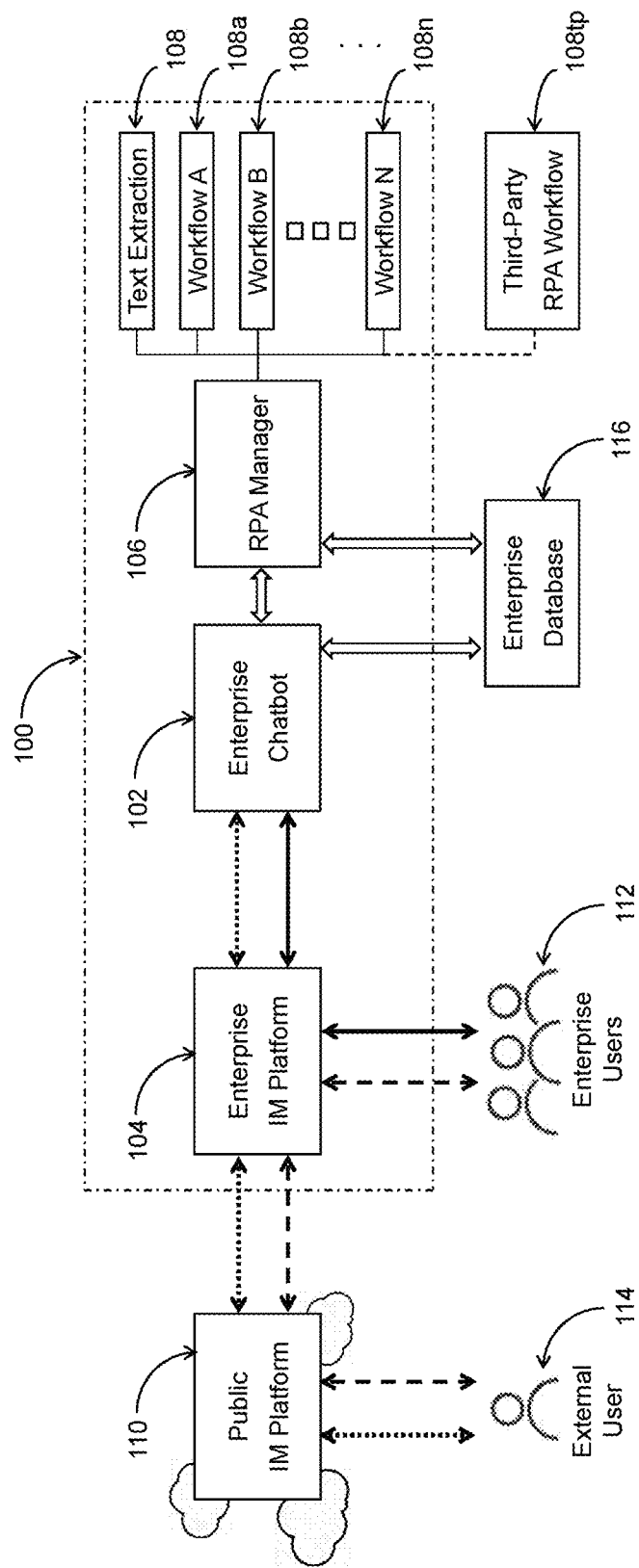
FIG. 1 is a block diagram illustrating an instant-messaging bot for providing robotic process automation, consistent with some embodiments of the present invention.

FIG. 1 illustrates an embodiment of instant-messaging bot 100 for providing robotic process automation (RPA). The system includes a chatbot application 102, an instant-messaging (IM) platform 104, and a software RPA manager 106, all built for an enterprise (or organization). The RPA manager 106 contains multiple workflow modules 108-108n, each providing an automated workflow for the enterprise. The enterprise IM platform 104 is further connected to a public IM platform 110 over the Internet. The system allows enterprise internal users 112 connected to the enterprise IM platform 104, any external user 114 connected to the public IM platform 110, and the enterprise chatbot 102 to use instant messaging to communicate with one another either one-to-one or as a group.

The chatbot application 102 includes software for receiving, processing, analyzing and responding to human-generated messages in a human-like manner. It consists of three major parts: (1) a natural language processing and understanding (NLP/NLU) module for analyzing intent of an incoming message either from an enterprise user 112 or from an external user 114, (2) a dialog management (DM) module for interpreting the output (intent) from the NLP/NLU module, analyzing context of the ongoing human-chatbot communication, including preceding messages or other information related to the communication, and providing a responding instruction as output, and (3) a natural language generating (NLG) module for receiving the responding instruction from the DM module and generating a reply message either to the enterprise user 112 or to the external user 114.

The enterprise IM platform 104 includes software for managing traffic of IM messages exchanged among the enterprise users 112, the external user 114, and the enterprise chatbot 102. In FIG. 1, traffic of the message exchanges between the enterprise users 112 and the chatbot 102, that between the external user 114 and the chatbot 102, and that between the enterprise users 112 and the external user 114 are indicated with solid arrows, doted arrows, and dashed arrows, respectively. The exchanged messages may include text, images, videos, hyperlinks, or other digital contents. For more details about the enterprise chatbot 102 and the enterprise IM platform 104, see U.S. patent application Ser. No. 16/677,645 filed on Nov. 7, 2019.

The RPA manager 106 includes software for configuring and executing built-in workflow modules 108-108n. Optionally, one or more RPA workflow modules 108tp supplied by third-party developers may also be connected to and controlled by the RPA manager 106 via application programming interface (API). To initiate a robotic workflow, internal or customer-facing, either an enterprise user 112 or an external user 114 can send a message to the enterprise chatbot 102 expressing such an intent. In response, the enterprise chatbot 102 instructs the RPA manager 106 to execute the intended workflow.

Certain workflows are end-to-end, i.e., an input is received and then an output is generated directly. Other workflows are interactive, with the user 112 or 114, the chatbot 102, and the RPA manager engaging in back-and-forth interactions during the process. In some cases, the enterprise chatbot 102 and the RPA manager 106 are linked to an enterprise database 116 in order to access additional information related to an ongoing instant-messaging conversation or a robotic workflow.

It is not uncommon for an enterprise chatbot to provide an incorrect answer, or no answer at all, to a user's inquiry, either due to the chatbot's inability to understand the nuances of human language or simply due to its lack of sufficient information. This could be taken as a poor user experience and detrimental for the enterprise. The present invention allows the enterprise users 112 (e.g., customer-care representatives) to intervene in an ongoing IM conversation between the external user 114 (e.g., customer) and the enterprise chatbot 102, and hence any friction or frustration likely encountered by the external user during the user-chatbot conversation may be remedied on the occasion, resulting in a better user experience for the enterprise.

The present invention provides robotic workflows including daily office processes. An example is robotic meeting arrangement inside an enterprise. The meeting organizer, an enterprise user 112, only needs to send a meeting request to the enterprise chatbot 102, including meeting subject, participant list, and desired time and venue. The enterprise chatbot 102, with the help of the RPA manager 106, will first check behind the scenes the availabilities of each participant and the venue, and then it makes recommendations to and receives confirmation from the meeting organizer. Once confirmed, the enterprise chatbot 102 will send meeting invitations as well as meeting reminders to the participants (also enterprise users) before the meeting.

Another example of office workflow is robotic leave application and approval for enterprise users. In this case, an enterprise user 112 submits a leave application via the enterprise chatbot 102 to his/her tiers of supervisor (also enterprise users) for approval. The enterprise chatbot 102, with the help of the RPA manager 106, will guide the approval process such that the enterprise's leave regulations are strictly followed, and it will send remainders to the supervisors to ensure that the approval process is timely.

The present invention further provides robotic workflows involving textual-content extraction from digital images. The simplest of such workflows are end-to-end, wherein the user 112 or 114 sends a digital image to the enterprise chatbot 102, the latter forwards the image to the RPA manager 106 for textual-content extraction, and the result is sent back to the user 112 or 114 via the chatbot 102.

Interactive robotic workflows involving textual-content extraction are illustrated with the following robotic return-merchandise-authorization (RMA) process. RMA is essential to after-sale services for enterprises. While the majority of RMA claims are routine and repetitive, they occupy precious time of customer-care representatives, and hence the need for robotic RMA is strong.

The following sequence of robotic RMA represents an embodiment of the present invention:
(1) An external user 114 (customer) sends a message over the public IM platform 110 to the enterprise chatbot 102, requesting RMA for a damaged merchandise; a photograph of the product label is attached with the claim message;
(2) with its NLP capability, the enterprise chatbot 102 can understand the external user's intent; it forwards the product-label image to the RPA manager 106, which in turn executes the text-extraction module 108 and sends the result back to the enterprise chatbot 102;
(3) the enterprise chatbot 102 compares the product-label content (e.g., model and serial numbers) with sales records in the enterprise database 116 and determines whether the merchandise is under warranty;
(4) depending on its finding, the enterprise chatbot 102 either issues an RMA number or sends a rejection message to the external user 114; and
(5) if the external user 114 responds to the enterprise chatbot 102 with a message expressing a negative sentiment, the chatbot 102 escalates the issue to an enterprise user 112 (customer-care representative), and the later then engages in the ensuing conversation with the external user 114.

Textual-Content Extraction Methods

The present invention provides textual-content extraction methods comprising two steps: (1) text detection for an input image, providing the locations and sizes of text lines in the image, and (2) text recognition for each text line detected in step (1). Architectures of two independent text-detection methods and one text-recognition method are presented in FIG. 2, FIG. 3, and FIG. 4, respectively. These methods are derived from existing deep learning models based on convolutional neural network (CNN). To facilitate a detailed description of the present invention, the concepts and methodologies of basic CNN and the relevant deep learning models are included in the following description.

Basic Convolutional Neural Network (CNN)

Figure 5:
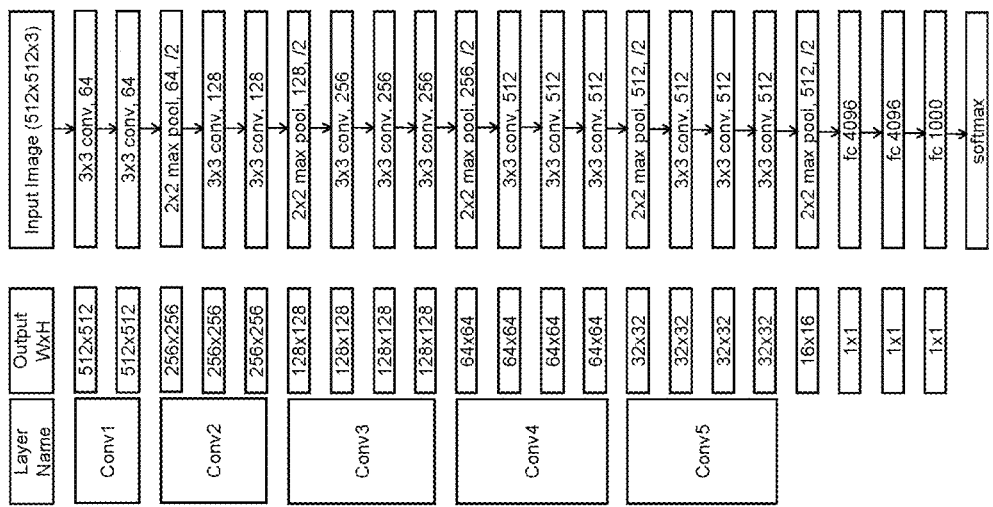
FIG. 5 is the VGG-16 architecture for image recognition.
Figure 6:
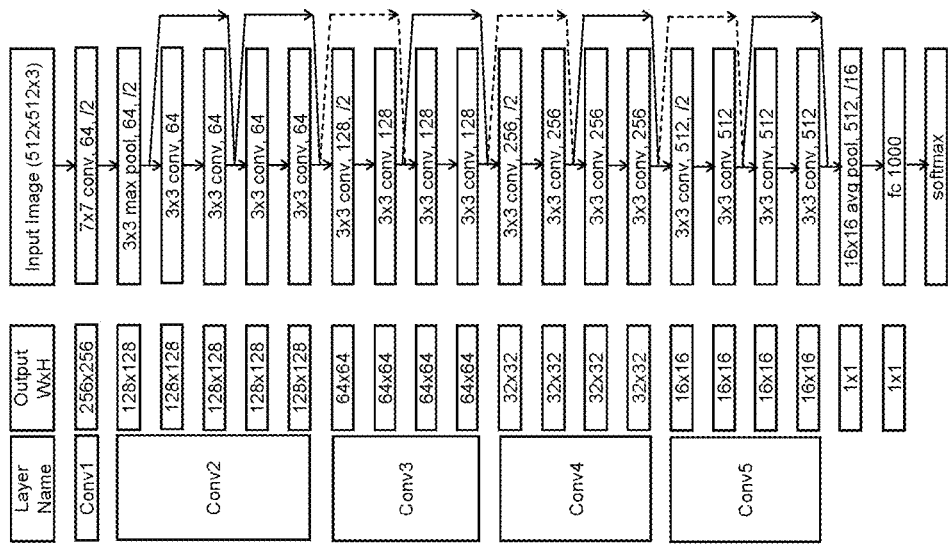
FIG. 6 is the ResNet-18 architecture for image recognition, wherein the convolutional backbone contains shortcut connections bypassing specific convolutional operations as indicated (solid arrow: identity connection; dashed arrow: projection connection).

CNNs for automatic detection, classification and recognition of objects in digital images have seen widespread applications in recent years. For illustrating the present invention, the architectures of two well-known CNN models, VGG-16 (K. Simonyan, A. Zisserman, "Very deep convolutional networks for large-scale image recognition", arXiv: 1409.1556 (2014)) and ResNet-18 (K. He, X. Zhang, S. Ren, J. Sun, "Deep residual learning for image recognition", arXiv: 1512.03385 (2015)), are shown in FIG. 5 and FIG. 6, respectively. A CNN pipeline contains a convolutional backbone for extracting spatial features of an image, followed by a decoding path for detecting, classifying, or recognizing objects in that image.

A normal convolutional backbone comprises multiple stacks of convolutional, pooling and rectified-linear-unit (ReLU) operations arranged in a specific order. As shown in FIG. 5 and FIG. 6, the input image is first passed through a convolutional backbone, generating a series of feature maps of progressively reduced spatial resolutions (with W×H cells) that contain local features of increasing spatial scales. The resolution of feature maps generated in each convolutional layer (denoted Conv1 through Conv5) depends on that of the input image. In FIG. 5 and FIG. 6, an input resolution of 512×512 pixels is assumed. Within the convolutional backbone, each convolutional operation involves a spatial filter (known as kernel) scanning through the image or any of its subsequent feature maps. The number of filters (i.e., number of channels) for each convolutional operation provides the depth of the resulting feature map. Each pooling operation is carried out by a scanning spatial filter that takes either the maximum (max pool) or the average (avg pool) of feature-cell values covered by the pooling filter. The ReLU operation, commonly used after each convolutional operation, essentially sets all negative feature-cell values to zero and keeps positive feature-cell values unchanged. In FIG. 5 and FIG. 6, a convolutional or pooling operation is denoted with its filter size, channel number and stride (size of each scanning step); for example, "3×3 cony, 256, /2" stands for "3×3 convolution filter, 256 channels, and a stride of 2". For simplicity, all feature maps hereinafter are assumed to be padded for convolutional and pooling operations such that an operation with a stride of 1 does not change the size (W×H) of a feature map, and that with a stride of 2 reduces the size by one half (W/2×H/2). The ReLU operations are not explicitly shown in FIG. 5 and FIG. 6. The decoding path of VGG-16 or ResNet-18 comprises one or more fully connected (fc) neural layers, and a softmax operation, which is a standard activation function normalizing the output scores.

In CNN, each convolutional operation or a fully connected layer is weighted with trainable parameters. A CNN model of practical use may contain tens of millions trainable parameters (e.g., 138.4 million for VGG-16 and 11.5 million for ResNet-18). Therefore, in order to train fully a CNN model, a large number (e.g., hundreds of thousands to millions) of labeled training images may be required. This is not practical for most applications where only a limited number (e.g. hundreds to tens of thousands) of training images are available. Fortunately, a CNN model for applications in a specific domain can still be made effective if it properly adopts a pre-trained CNN model either in its entirety or in part. In such cases, the CNN model or its derivatives can be trained successfully with a smaller set of images relevant to the specific domain. Some embodiments of the present invention have adopted a pre-trained convolutional backbone of VGG-16, ResNet-18, or their respective variants. In general, the ResNet variants have fewer trainable parameters and easier to train than their VGG counterparts.

Single Shot Multi-Box Detector (SSD)

Figure 7:
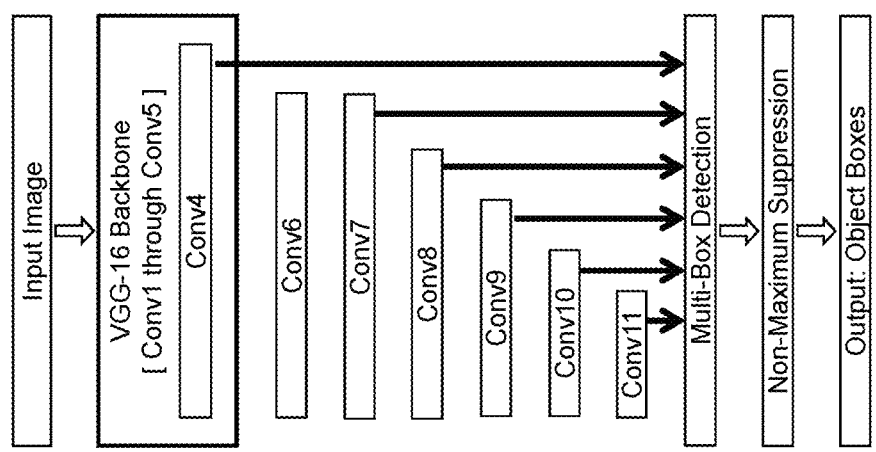
FIG. 7 is the SSD architecture for generic object detection of digital images.

SSD is a CNN for detecting generic objects from digital images (W. Liu, D. Anguelov, D. Erhan, C. Szegedy, S. Reed, C. Y. Fu, A. C. Berg, "SSD: Single Shot Multi-Box Detector", arXiv: 1512.02325 (2016)). It is among the more efficient object-detection models, providing both accuracy and speed. The SSD architecture is depicted in FIG. 7. SSD utilizes the convolutional backbone of VGG-16 by keeping VGG-16's Conv1 through Conv5 layers, and it appends additional convolutional layers that generate progressively smaller feature-map sizes (i.e., smaller W×H).

Figure 8:
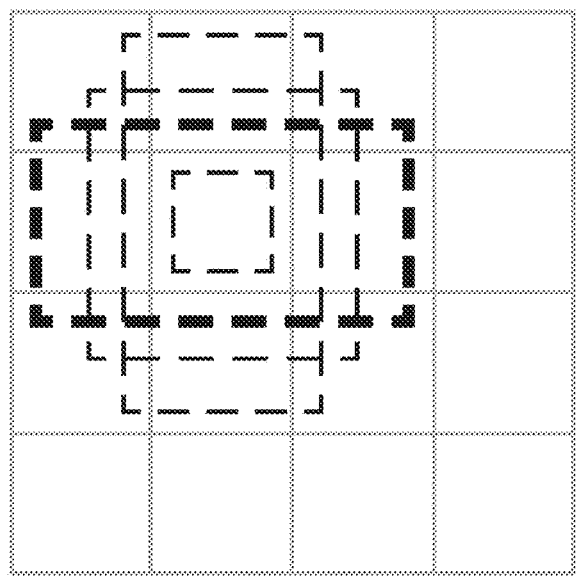
FIG. 8 is an illustration of the SSD object-detection mechanism (from W. Liu, D. Anguelov, D. Erhan, C. Szegedy, S. Reed, C. Y. Fu, and A. C. Berg, "SSD: Single Shot Multi-Box Detector", arXiv: 1512.02325 (2016)). (a) Input image showing two object-bounding boxes, respectively for the detected cat and dog. (b) An 8×8 feature map with detector boxes of different aspect ratios associated with each cell. The two detector boxes responsible for detecting the cat are indicated with thick-dashed lines. (c) A 4×4 feature map with detector boxes of different aspect ratios associated with each cell. The single detector box responsible for detecting the dog is indicated with thick-dashed lines.
Figure 8:
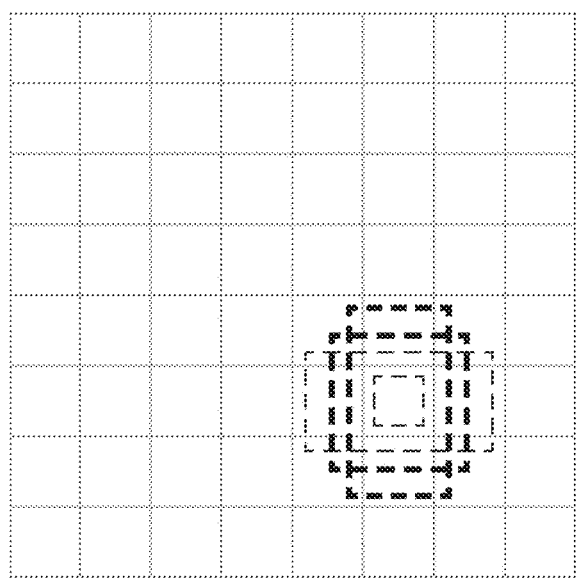
Figure 8:
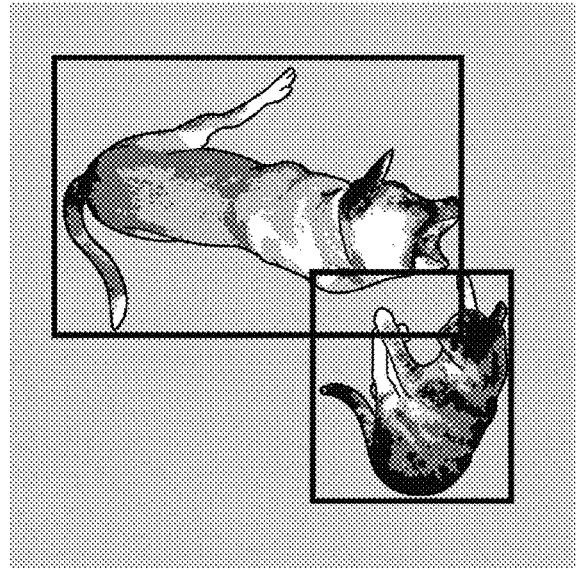

The detection layer of SSD takes, as its input, feature-cell values of the Conv4 feature map and that of the smaller feature maps generated in the appended convolutional layers (as indicated with thick solid arrows in FIG. 7), and associated with each feature cell it uses a number of detector boxes of multiple aspect ratios (as illustrated in FIG. 8(*b*), (*c*)). In general, objects of larger scales are more likely detectable in smaller feature maps (with larger cell sizes), and vice versa. This mechanism effectively detects both the categories and locations of objects of multiple scales all in one shot. FIG. 8 illustrates the detection of a cat and a dog in an input image of FIG. 8(*a*). In FIG. 8(*b*), the smaller-sized cat is detected in the 8×8 feature map by two detector boxes, and in FIG. 8(*c*), the larger-sized dog is detected in the 4×4 feature map by a single detector box.

The detection-layer output provides the category score, coordinates and size of the bounding box for each detected object. The object bounding box does not have to coincide with the detector box that detects the object. Normally there are offsets in coordinates, height and width between the two. Furthermore, the same object could be detected by multiple detector boxes, resulting in multiple candidates for the object bounding box. The final step of SSD, Non-Maximum Suppression, is a rule-based method for selecting the best bounding box for each object detected.

Connectionist Text Proposal Network (CTPN)

Detection of text and that of generic objects differ in two major aspects. First, unlike a generic object that usually has a well-defined closed boundary, text is an assembly of separated elements (e.g., English letters, Chinese characters, punctuations, spaces), and hence the boundary of text is not well-defined. Second, text detection normally requires a higher accuracy than that of generic object detection. This is because a partially detected text line can result in substantial errors in subsequent text recognition. Consequently, methods for detecting generic objects, such as SSD, are not effective for detecting text.

Figure 9:
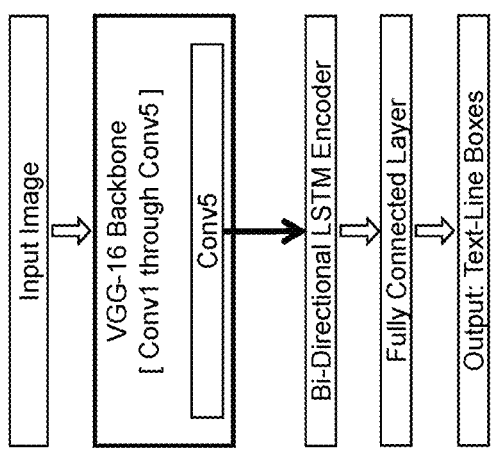
FIG. 9 is the CTPN architecture for text detection of digital images.
Figure 10:
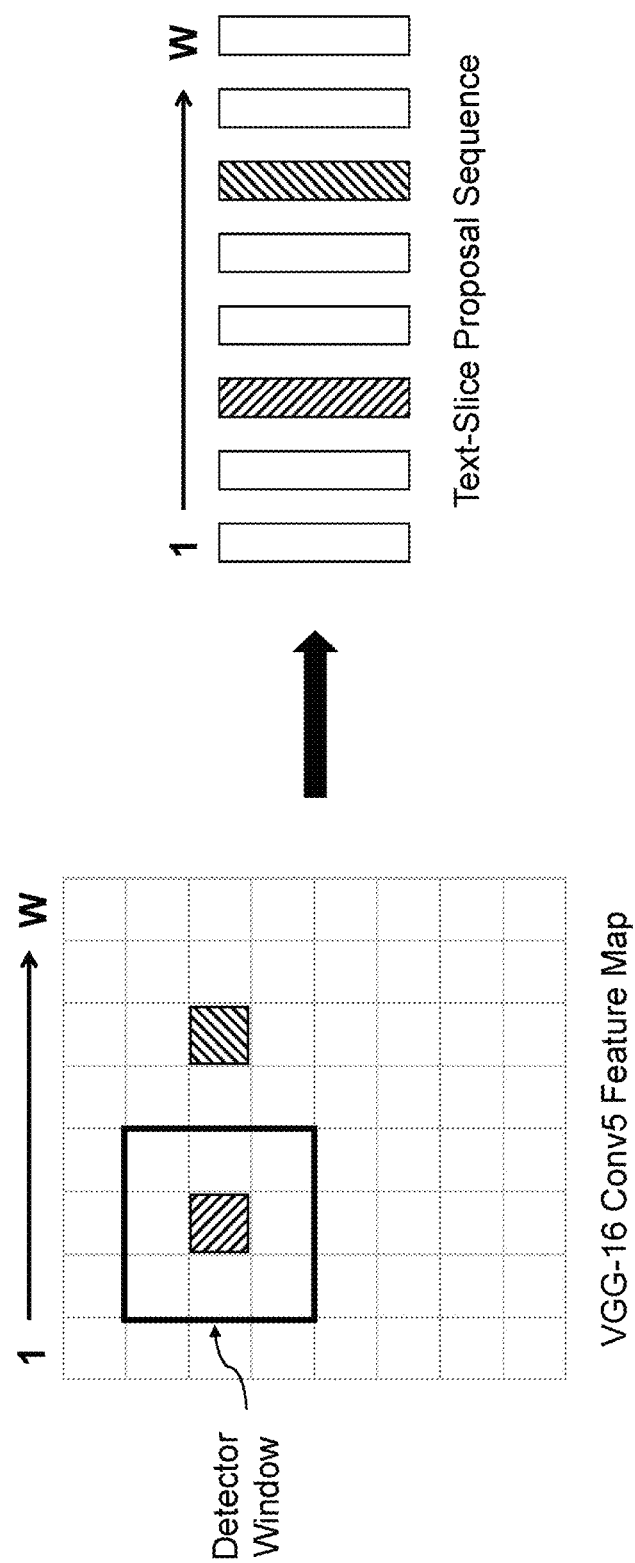
FIG. 10 is an Illustration of the CTPN text-detection mechanism. A 3×3 detector window sliding densely across the horizontal direction of the Conv5 feature map generates a sequence of text-slice proposals for subsequent processing. The spatial resolution (W×H) of the VGG-16's Conv5 feature map is determined by that of the input image. For an input image of 512×512 pixels, W=32 and the width of each feature-map cell is equivalent to 16 pixels.

Connectionist Text Proposal Network (CTPN) was designed specifically for text detection (Z. Tian, W. Huang, T. He, P. He, Y. Qiao, "Detecting text in natural image with Connectionist Text Proposal Network", arXiv: 1609.03605 (2016)). The CTPN architecture is depicted in FIG. 9. Similar to SSD, it utilizes the convolutional backbone of VGG-16 by keeping VGG-16's Conv1 through Conv5 layers, but the similarity ends there. Right after the truncated VGG-16, CTPN utilizes a small detector (a 3×3 window) densely sliding horizontally through the Conv5 feature map to investigate the fine textual information, as shown in FIG. 10. In this fashion, CTPN detects a text line in a sequence of fine "text-slice" proposals, with each text-slice proposal having a fixed width (e.g., 16 pixels for an input image of 512×512 pixels) that represents only a small portion of the text line.

Furthermore, CTPN provides a vertical anchor mechanism that simultaneously predicts the vertical location, height, and text/non-text score of each text-slice proposal. In FIG. 9, each text-slice proposal sequence is fed into a recurrent neural network (RNN) with a bi-directional long short-term memory (LSTM) architecture. Sequential characteristics of text are encoded with the LSTM layer. In other words, the LSTM encoder serves to associate individual text-slice proposals in sequences. Once text-slice proposals are detected by CTPN, text lines are constructed by connecting continuous text-slice proposals whose text/non-text score is over a threshold value (e.g., 0.7). Adjacent text-slice proposals are grouped into the same text line if the horizontal distance between them is less than 50 pixels and their vertical overlap exceeds 0.7.

Although CTPN is accurate in detecting text, its speed (e.g., 7 frames per second) is only a fraction of the speed of SSD (e.g., 59 frames per second). Therefore, a text-detection method providing both accuracy and speed is in need.

Text-Detection Method 1 of the Present Invention: Connectionist Text Single Shot Multi-Slice Detector (CT-SSD)

Figure 2:
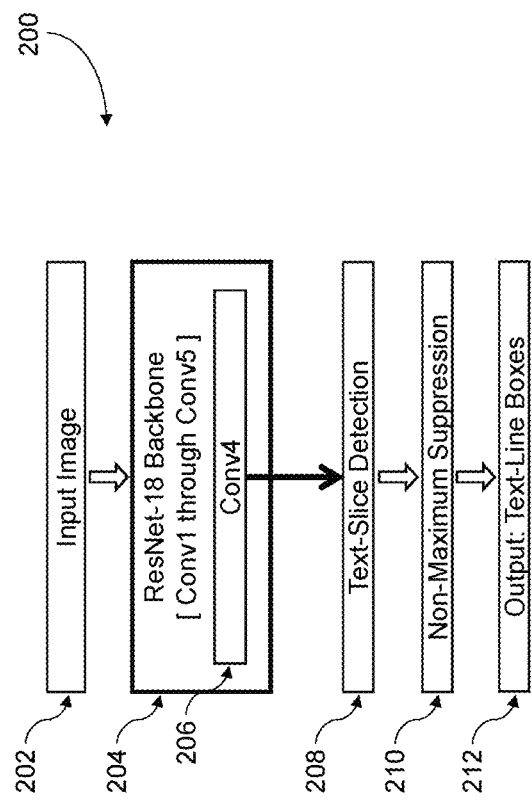
FIG. 2 is the architecture of CT-SSD for text detection of digital images, consistent with some embodiments of the present invention.

The present invention provides a text-detection method that is a hybrid of CTPN and SSD, and it is named Connectionist Text Single Shot Multi-Slice Detector (CT-SSD). The objective of CT-SSD is to achieve both the text-detection accuracy of CTPN and the speed of SSD. The CT-SSD architecture 200 is depicted in FIG. 2. Similar to that of SSD and CTPN, CT-SSD utilizes the convolutional backbone 204 of a pre-trained CNN model (e.g., truncated ResNet-18 or VGG-16), but CT-SSD contains neither SSD's extra convolutional layers, nor CTPN's bulky LSTM encoder network.

Figure 11:
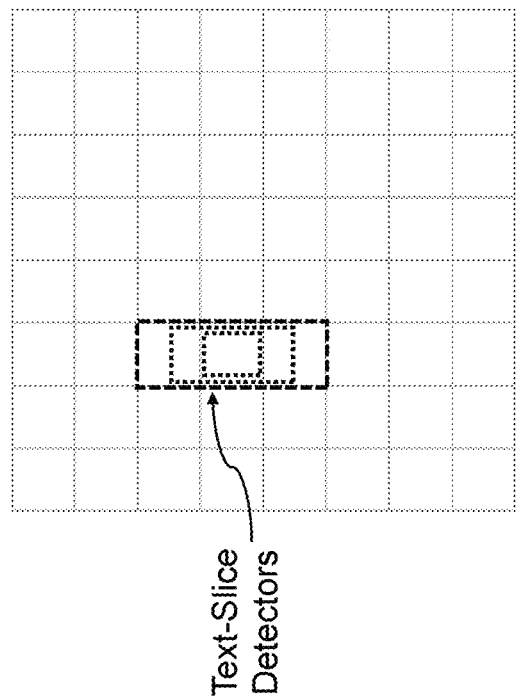
FIG. 11 is an illustration of the CT-SSD text-slice detectors sampling the ResNet-18's Conv4 feature map, consistent with some embodiments of the present invention. For an input image of 512×512 pixels, the width of the detectors is fixed at 16 pixels (the feature-cell width).

CT-SSD adopts the multi-box detection mechanism of SSD, but it samples only a single convolutional layer 206 (e.g., Conv4 of ResNet-18) for detecting fine text slices, as CTPN does. Notice that from FIG. 5 and FIG. 6, each convolutional layer may contain several feature maps of the same resolution (W×H) and depth (number of channels). For text detection using CT-SSD, it is sufficient to sample only the last feature map of a convolutional layer 206. Furthermore, the detector boxes associated with each feature cell of CT-SSD are of a fixed width and multiple heights (i.e., multiple aspect ratios), as illustrated in FIG. 11. The slim detector boxes are termed "text-slice detectors". A preferred embodiment of CT-SSD provides text-slice detectors with aspect ratios in the range of [1, 8]. The spatial resolution of the text-slice detection is determined by the width of the text-slice detectors, which is in turn set by the feature-cell width of the sampled feature map. For example, for the embodiment depicted in FIG. 11, the detection resolution is 16 pixels (equivalent to the cell width of the sampled 32×32 feature map) for an input image 202 of 512×512 pixels. Other detection resolutions can be achieved simply by sampling a feature map of different resolution.

Figure 12:
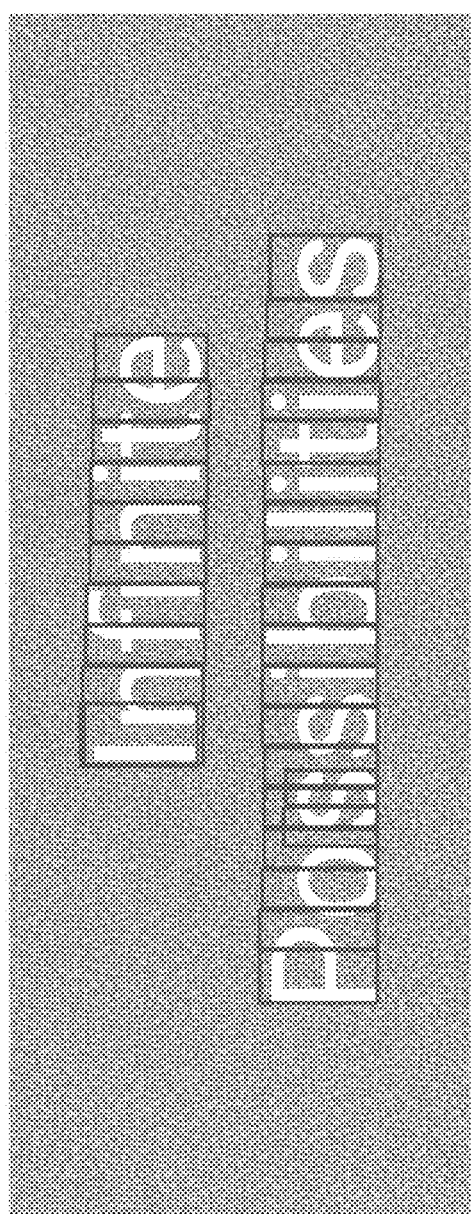
FIG. 12 is an example of text detection using CT-SSD of the present invention, showing (a) detected text-slice candidates, and (b) detected text-line boxes after text-line construction.
Figure 12:
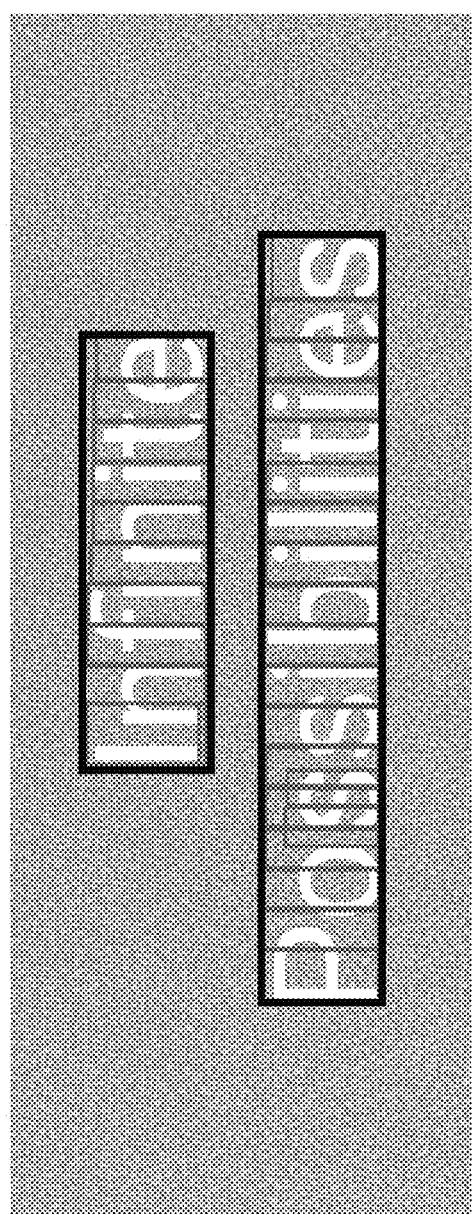

The text-slice detection output 208 provides preliminary text-slice candidates with their coordinates, heights, and text/non-text scores. The preliminary text-slice candidates are further filtered with Non-Maximum Suppression 210 for selecting the most likely text-slice candidates. An example of text-slice detection using CT-SSD is shown in FIG. 12(*a*), where detected text-slice candidates are marked with slices of various heights and widths. Unlike CTPN's text-slice proposals whose width is fixed, the widths of CT-SSD's text-slice candidates are allowed to vary. Once text-slice candidates are detected, text lines are constructed in the output layer 212 by connecting text-slice candidates using similar text-construction rules as that of CTPN. That is, adjacent text-slice candidates are grouped into the same text line if the horizontal distance between them is less than a preset value (e.g., 50 pixels) and their vertical overlap exceeds a preset value (e.g., 0.7). This is illustrated in FIG. 12(*b*). Experimental comparisons between CT-SSD and CTPN have shown that the former can achieve better accuracy with a 10-fold speed.

U-Net

An alternative approach for detecting objects in pixelated images is semantic image segmentation. In this approach, every pixel of the image is classified according to categories of the objects being detected. U-Net is a CNN designed for semantic image segmentation (O. Ronneberger, P. Fischer, T. Brox, "U-Net: Convolutional networks for biomedical image segmentation", arXiv: 1505.04597 (2015)). The present invention provides a text-detection method utilizing the semantic segmentation approach based on U-Net.

Figure 13:
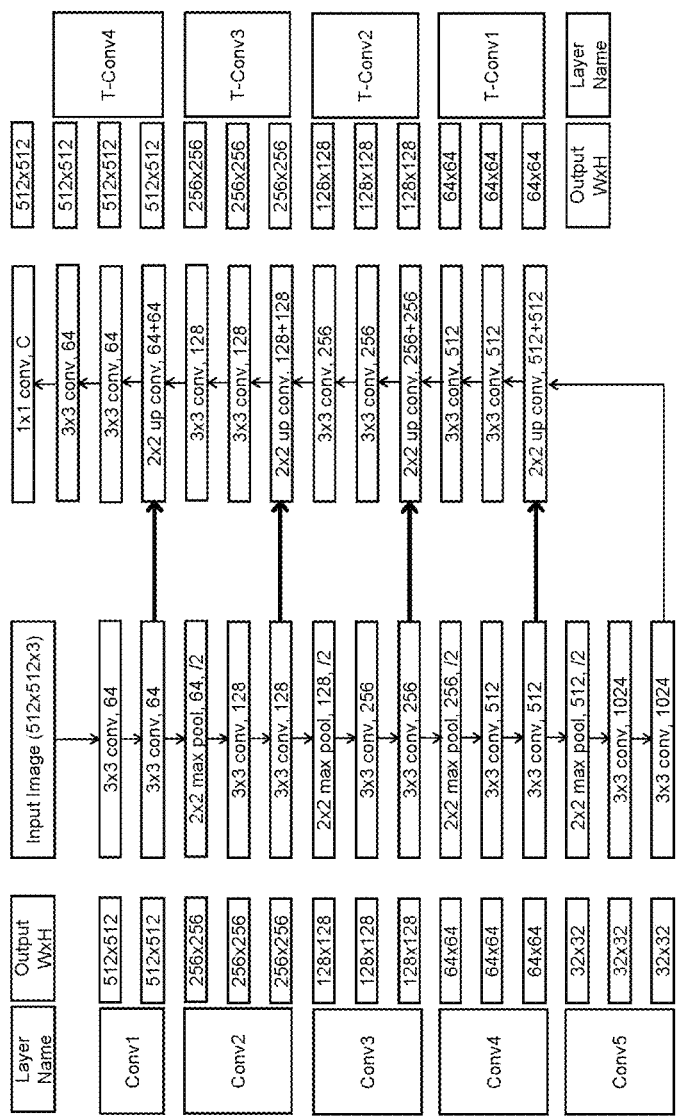
FIG. 13 is the U-Net architecture for semantic image segmentation.

The U-Net architecture is depicted in FIG. 13. It comprises a typical convolutional path (Conv1 through Conv5) for extracting features of multiple scales from the input image, and a symmetric transposed-convolutional path (T-Conv1 through T-Conv4) for enabling precise localization to the pixel level. A transposed convolutional operation (denoted "up conv" in FIG. 13) takes the value of a single cell from a feature map and projects it onto multiple cells with weighted values in a higher-resolution feature map, and hence the feature-map size (W×H) increases progressively for the transposed-convolutional layers. Furthermore, the up-sampled feature map of each transposed-convolutional layer is concatenated with the feature map of the same size from the corresponding convolutional layer (as indicated with thick solid arrows in FIG. 13). It is the concatenation operation that helps the simultaneous detection of context and localization of images. The output layer (denoted "1×1 conv, C", where C is the number of classes for objects being detected) provides the category scores for each pixel of the input image.

Text-Detection Method 2 of the Present Invention: Watershed U-Net Segmentation

Since the boundary of text is not well-defined, text detection using segmentation alone may not be able to resolve possible ambiguities at a text boundary, particularly if the spacing between adjacent text lines is small. To solve this problem, the present invention provides a text-detection method that combines the U-Net segmentation with Watershed algorithm—the latter is known for segmenting mutually touching objects. This new method is named Watershed U-Net Segmentation.

Figure 3:
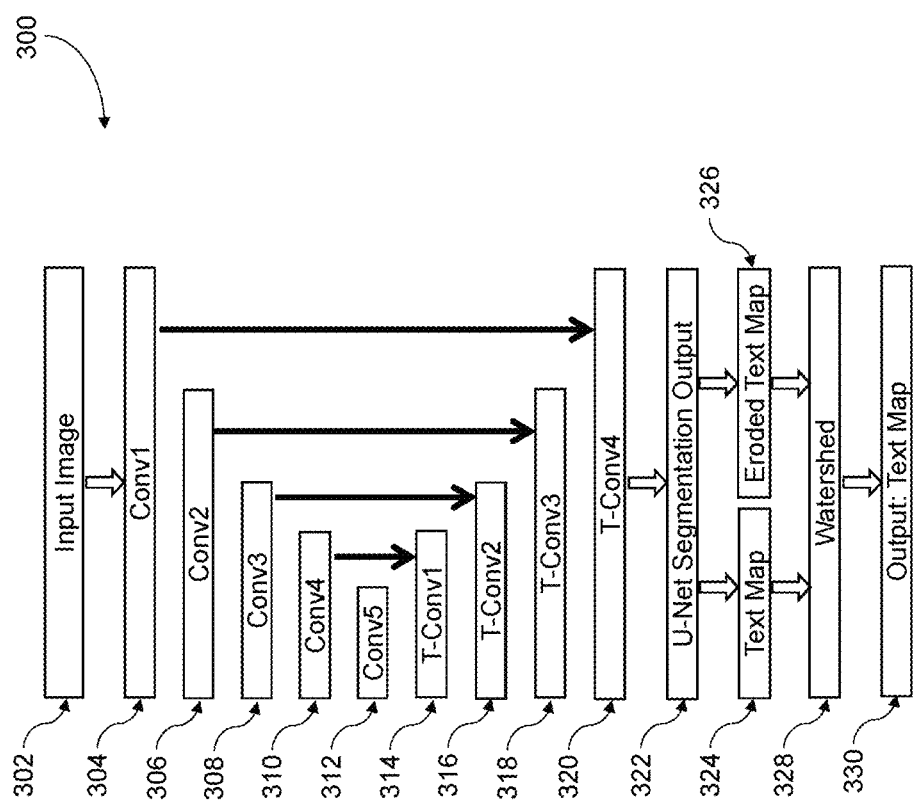
FIG. 3 is the architecture of Watershed U-Net Segmentation for text detection of digital images, consistent with some embodiments of the present invention.
Figure 14:
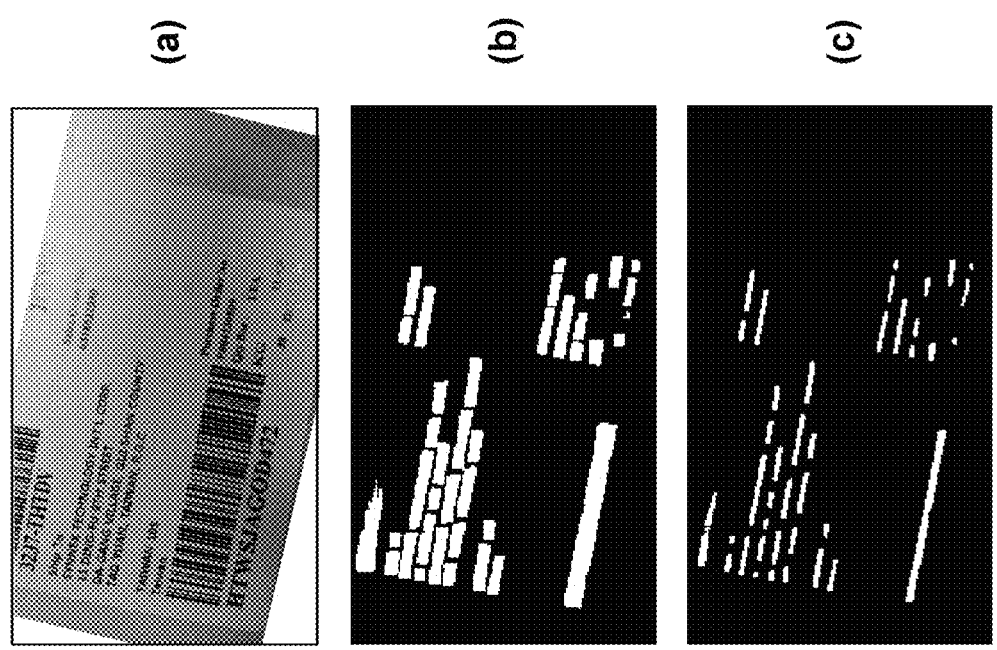
FIG. 14 is an example of text detection using Watershed U-Net Segmentation of the present invention, showing (a) input image, (b) text map after U-Net segmentation, and (c) eroded-text map after U-Net segmentation. An output text map (not shown) is obtained by processing the two intermediate text maps of FIGS. 14(b) & (c) using Watershed algorithm.

The architecture of Watershed U-Net Segmentation 300 is depicted in FIG. 3. The U-Net model 304-322 is adopted in its entirety. However, in addition to its regular output in the form of a "text map (i.e., pixelated text distribution)" 324, an auxiliary output channel is added, resulting in an "eroded-text map" 326, as illustrated in FIG. 14(*b*) and FIG. 14(*c*), respectively. In order to train the U-Net model to provide simultaneously the text map and the eroded-text map, the original training images are augmented with images generated by cropping 15% off all edges of every labeled text line. After the U-Net segmentation, the two intermediate text maps are processed using Watershed algorithm 328, yielding the final, optimized text map at the output layer 330.

Figure 15:
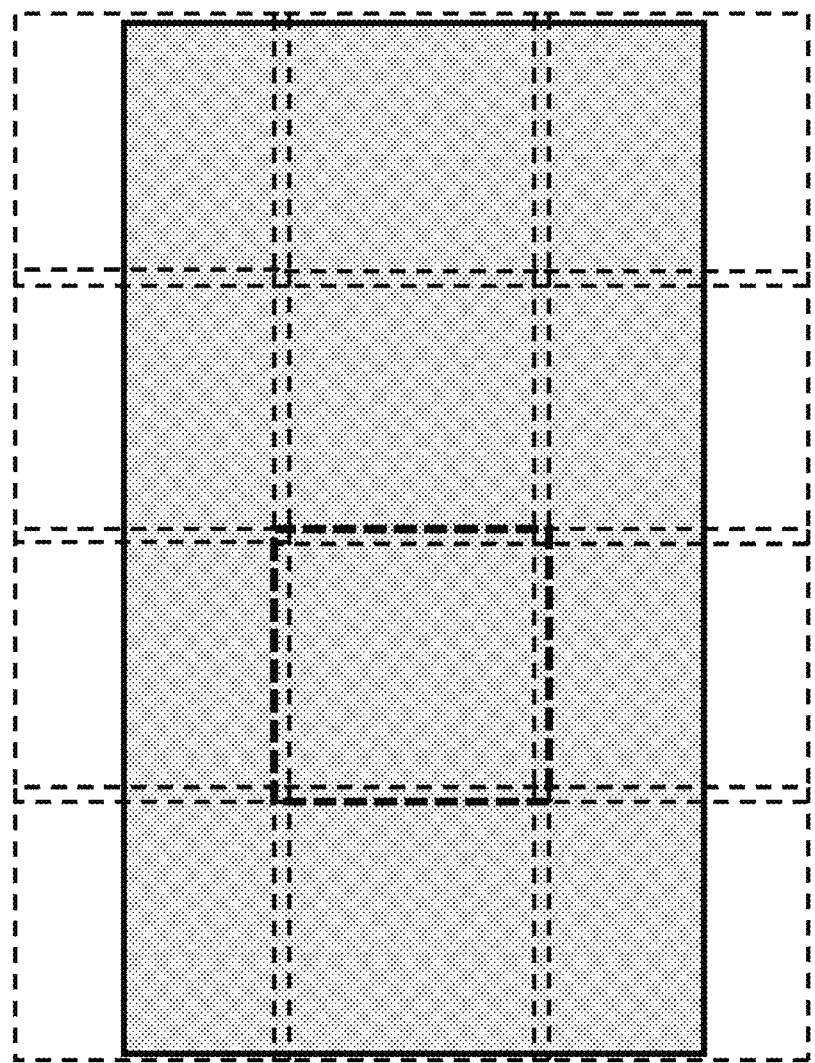
FIG. 15 is an illustration of image pre-processing using an overlapping-tiles method prior to text detection, consistent with some embodiments of the present invention. In this example, the resolution of the input image (shaded rectangle) is 1920×1080 pixels; the resolution of individual tiles (dashed rectangles) is 512×512 pixels; the overlap between adjacent tiles is 32 pixels; and the tiles at edges are padded as needed.

For practical applications, the resolutions of input images may vary substantially. To facilitate fully automated text detection, an overlapping-tiles method is carried out prior to the aforementioned text-detection step. This is illustrated in FIG. 15, wherein the resolution of the input image (shaded rectangle) is 1920×1080 pixels; the resolution of individual tiles (dashed rectangles) is fixed at 512×512 pixels; the overlap between adjacent tiles is 32 pixels; and the tiles at edges are padded as needed. Within each individual tile, text lines are detected using CT-SSD or Watershed U-Net Segmentation. The results are then combined, yielding locations and sizes of detected text lines with respect to the full input image.

Text-Recognition Method of the Present Invention: Connectionist Temporal Classification CNN (CTC-CNN)

The two text-detection methods of the present invention provide locations and sizes (w×h) of detected text lines within the input image. This is followed by a text-recognition process for recognizing the textual content of each text line, which is a sequence-to-sequence process that can be effectively addressed with a CNN using Connectionist Temporal Classification (CTC) as the loss function (F. Borisyuk, A. Gordo, V. Sivakumar, "Rosetta: Large scale system for text detection and recognition in images", arXiv: 1910.05085 (2019)).

Figure 4:
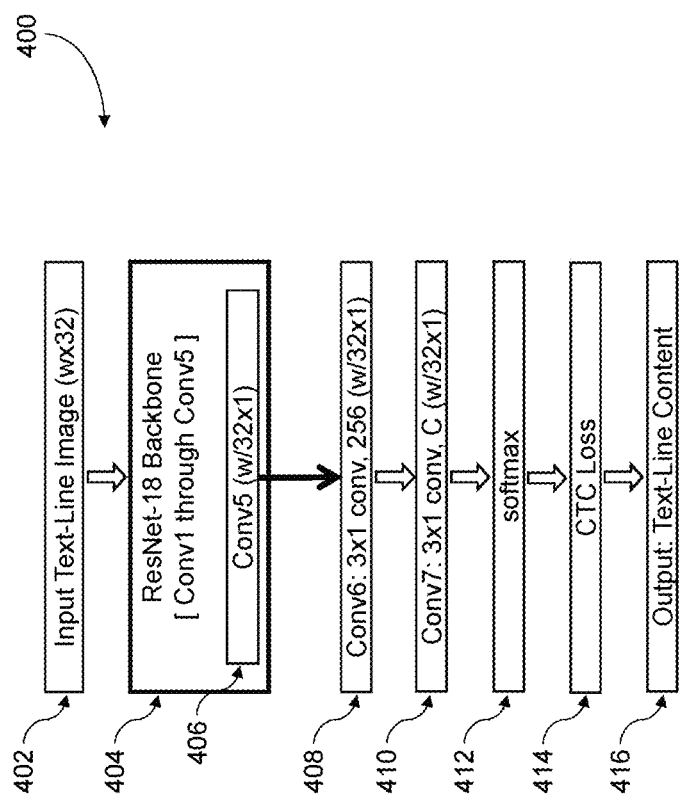
FIG. 4 is the architecture of CTC-CNN for text recognition of digital text-line images, consistent with some embodiments of the present invention. The resolution of the input text-line image and that of its feature maps are indicated in the parentheses.

The architecture of CTC-CNN 400 is depicted in FIG. 4. It utilizes the convolutional backbone 404 of a pre-trained CNN model (e.g., truncated ResNet-18 through the Conv5 layer). For both training and testing, all text-line images 402 are resized to w×32 (fixed height of 32 pixels), keeping their aspect ratios unchanged. Consequently, the feature map 406 at the end of the convolutional backbone (Conv5) has a resolution of w/32×1—a one dimensional feature sequence having w/32 cells, with each cell representing a position of the input text-line image 402. The Conv5 layer is followed by two consecutive one-dimensional convolution operations 408 and 410 using a 3×1 convolutional filter, with the output feature sequence having C channels corresponding to the number of textual elements to be classified. In one embodiment of the present invention, C=4,593, corresponding to 52 English letters, 10 numbers, 40 punctuations, and 4,491 Chinese characters. The softmax operation 412, coupled with the CTC loss function 414, provides the probability distribution of all classes for each cell of the sequence.

Finally, the textual content 416 of the input text-line image 402 is obtained by dropping off blanks and duplicated textual elements.

The present invention discloses systems and methods of instant-messaging bot for robotic process automation (RPA) and robotic textual-content extraction from digital images. Such a system includes a chatbot application, a software RPA manager, and an instant-messaging (IM) platform, all built for an enterprise. The RPA manager contains multiple modules of enterprise workflows and receives instructions from the enterprise chatbot for executing individual workflows. The enterprise IM platform is further connected to one or more public IM platforms over the Internet.

The system allows enterprise users connected to the enterprise IM platform, and external users connected to the public IM platforms, to use instant messaging to communicate with the enterprise chatbot and with one another either one-to-one or as a group. It further enables the enterprise users and the external users to initiate enterprise workflows, either internal or customer-facing, that are automated with the help of the enterprise chatbot and delivered via instant messaging.

Furthermore, the present invention incorporates textual-content extraction from digital images in the RPA manager as an enterprise workflow, and it provides improved convolutional neural network (CNN) methods for textual-content extraction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system of instant-messaging bot for robotic process automation (RPA) comprising:
   a chatbot application for an enterprise (or organization) including software for receiving, processing, analyzing and responding to human-generated messages in a human-like manner;
   a software RPA manager for said enterprise containing multiple workflow modules and receiving instructions from said chatbot for executing said workflows;
   an instant-messaging (IM) platform for said enterprise connected to said chatbot application and separately connected to one or more public IM platforms via the Internet; and
   said enterprise IM platform including software for managing traffic of IM messages exchanged among said chatbot, users of said enterprise connected to said enterprise IM platform, and external users connected to said public IM platforms;
   wherein:
      said enterprise IM platform automatically attaches visible identification (ID) labels to messages passing through it to identify the receiver and the sender of every message whenever necessary to avoid ambiguity, and hence allowing said chatbot and said human agents to share a single messaging channel over said public IM platform for communicating with said user;
      said enterprise IM platform, upon receiving any incoming message from said user without a receiver ID, directs the message to an enterprise receiver according to the following rule: (1) sending the message to said chatbot or a said human agent who is the current participant of ongoing IM communication with said user; (2) sending the message to said chatbot or a said human agent who is designated as the default receiver if the message is to initiate a new IM communication; and
      said enterprise IM platform supports multi-channel messaging for any said human agent to engage in an IM communication with said chatbot or another human agent in parallel with said human agent's ongoing IM communication with said user.

2. The system of instant-messaging bot for robotic process automation of claim 1, wherein a said workflow module is for meeting arrangement in said enterprise.

3. The system of instant-messaging bot for robotic process automation of claim 1, wherein a said workflow module is for leave application and approval in said enterprise.

4. The system of instant-messaging bot for robotic process automation of claim 1, wherein a said workflow module is for textual-content extraction from pixelated digital images provided by said enterprise users via said enterprise IM platform, or by said external users via said public IM platforms.

5. The system of instant-messaging bot for robotic process automation of claim 1, wherein a said workflow module is for return-merchandise-authorization (RMA) processes.

6. A system of instant-messaging bot for robotic process automation comprising:
   a chatbot application for an enterprise (or organization) including software for receiving, processing, analyzing and responding to human-generated messages in a human-like manner;
   a software RPA manager for said enterprise containing multiple workflow modules and receiving instructions from said chatbot for executing said workflows;
   an instant-messaging (IM) platform for said enterprise connected to said chatbot application and separately connected to one or more public IM platforms via the Internet; and
   said enterprise IM platform including software for managing traffic of IM messages exchanged among said chatbot, users of said enterprise connected to said enterprise IM platform, and external users connected to said public IM platforms;
   wherein:
      said workflow module is for textual-content extraction from pixelated digital images provided by said enterprise users via said enterprise IM platform, or by said external users via said public IM platforms;
      said textual-content extraction comprises:
         a text-detection step for determining locations and sizes of text lines in said images, followed by a text-recognition step for recognizing textual content of each detected text line, and
         said text-detection step and text-recognition steps being accomplished by convolutional neural network (CNN) methods;
      said text-recognition method comprises:
         a convolutional neural network (CNN) backbone for extracting spatial features of a said text-line image;
         a decoding path for extracting textual content from the text-line image;
         said CNN backbone consisting of sequential convolutional layers composed of convolutional, rectified-linear-unit (ReLU), and pooling operations for generating a series of multi-channel feature maps from the text-line image;

each said convolutional layer containing feature maps having the same spatial resolution and the same number of channels, while its subsequent convolutional layer containing feature maps having an equal or lower spatial resolution and a larger number of channels;

said decoding path consisting of one or more one-dimensional convolutional layers, a softmax operation, and a Connectionist Temporal Classification (CTC) loss function, providing textual content of the text-line image as output.

7. A method for automatic detection of text lines in pixelated digital images, comprising:
 a convolutional neural network (CNN) backbone for extracting spatial features of a said image;
 a text-slice detection layer for detecting text-slice candidates;
 a filtering layer for selecting most likely text-slice candidates; and
 a text-construction layer for associating text-slice candidates into text lines;
 said CNN backbone consisting of sequential convolutional layers composed of convolutional, rectified-linear-unit (ReLU), and pooling operations for generating a series of multi-channel feature maps from the image;
 each said convolutional layer containing feature maps having the same spatial resolution and the same number of channels, while its subsequent convolutional layer containing feature maps having an equal or lower spatial resolution and a larger number of channels;
 said text-slice detection layer probing one of said feature maps by applying multiple text-slice detectors onto every cell of the probed feature map, with said text-slice detectors having a fixed width equal to the cell width and multiple heights corresponding to aspect ratios in the range of 1 through 8;
 said filtering layer using Non-Maximum Suppression for selecting the best text-slice candidates among those detected by said text-slice detection; and
 said text-construction layer grouping adjacent text-slice candidates from said filtering layer having a horizontal distance less than a preset value and a vertical overlap exceeding a preset value into the same text line.

8. A method for automatic detection of text lines in pixelated digital images, comprising:
 a convolutional neural network (CNN) consisting of a convolutional path followed by a transposed-convolutional path for generating intermediate, pixelated text-distribution maps from a said image; and
 a tuning layer for providing an optimal pixelated text-distribution map as output;
 said convolutional path consisting of sequential convolutional layers composed of convolutional, rectified-linear-unit (ReLU), and pooling operations for generating a series of multi-channel feature maps from the image;
 each said convolutional layer containing feature maps having the same spatial resolution and the same number of channels, while its subsequent convolutional layer containing feature maps having an equal or lower spatial resolution and a larger number of channels;
 said transposed-convolutional path consisting of sequential transposed-convolutional layers composed of transposed-convolutional, concatenation, convolutional, and ReLU operations for generating a series of multi-channel feature maps;
 each said transposed-convolutional layer containing feature maps having the same spatial resolution, with its first feature map generated by a transposed-convolutional operation on the last feature map of a lower resolution from its preceding layer, followed by a concatenation operation with a feature map of the same resolution from a said convolutional layer;
 said CNN generating from the image two intermediate, pixelated text-distribution maps, one of original text and the other of eroded text; and
 said tuning layer applying Watershed algorithm on the two intermediate text-distribution maps, yielding, as output, an optimal pixelated text-distribution map free of overlapping text.

* * * * *